United States Patent
Sharp et al.

(10) Patent No.: US 8,893,855 B2
(45) Date of Patent: Nov. 25, 2014

(54) BEARING PROTECTION WITH POSITIVE LUBRICANT-LEVEL INDICATION

(75) Inventors: Bryson Sharp, Farmington, MN (US); John David Schuetz, Owatonna, MN (US); Brent Starnes, Lakeville, MN (US)

(73) Assignee: Northern Tool & Equipment Company, Inc., Burnsville, MN (US)

( * ) Notice: Subject to any disclaimer, the term of this patent is extended or adjusted under 35 U.S.C. 154(b) by 249 days.

(21) Appl. No.: 13/088,890

(22) Filed: Apr. 18, 2011

(65) Prior Publication Data

US 2012/0261215 A1 Oct. 18, 2012

(51) Int. Cl.
| F16C 1/24 | (2006.01) |
| B60B 27/02 | (2006.01) |
| F16C 33/66 | (2006.01) |
| F16C 33/72 | (2006.01) |
| B60B 7/00 | (2006.01) |
| B60B 27/00 | (2006.01) |

(52) U.S. Cl.
CPC ....... *F16C 33/6625* (2013.01); *B60B 2900/561* (2013.01); *B60B 2900/113* (2013.01); *B60B 27/02* (2013.01); *F16C 2326/02* (2013.01); *B60B 27/001* (2013.01); *B60B 2900/531* (2013.01); *B60B 2900/3316* (2013.01); *F16C 33/723* (2013.01); *B60B 7/0013* (2013.01); *F16C 2233/00* (2013.01); *B60B 27/0073* (2013.01)
USPC .......................................................... 184/5.1

(58) Field of Classification Search
USPC .......................................................... 184/5.1
See application file for complete search history.

(56) References Cited

U.S. PATENT DOCUMENTS

| 243,523 | A | * | 6/1881 | DeBremon | 184/98 |
| 1,441,334 | A | * | 1/1923 | Fesler | 184/45.1 |
| 1,613,859 | A | * | 1/1927 | Waddell, Jr. | 184/45.1 |
| 2,457,537 | A | * | 12/1948 | Douglass | 384/471 |
| 3,077,948 | A | * | 2/1963 | Law | 184/45.1 |
| 3,498,413 | A | * | 3/1970 | Krieger | 184/45.1 |
| 4,190,133 | A | * | 2/1980 | Ploeger | 184/5.1 |
| 4,366,717 | A | * | 1/1983 | Foord et al. | 73/744 |
| 5,195,807 | A | * | 3/1993 | Lederman | 301/108.1 |
| RE34,391 | E | * | 9/1993 | Blake | 184/5.1 |
| 5,303,800 | A | * | 4/1994 | Persson | 184/5.1 |
| 6,199,662 | B1 | * | 3/2001 | Felk | 184/5.1 |
| 6,520,292 | B1 | * | 2/2003 | Kurtz et al. | 184/5.1 |
| 6,983,999 | B2 | * | 1/2006 | Goettker | 301/108.4 |
| 7,185,955 | B2 | * | 3/2007 | Dombroski | 301/108.1 |
| 7,314,256 | B1 | * | 1/2008 | Haines | 301/108.5 |
| 7,419,226 | B2 | * | 9/2008 | Jenkinson et al. | 301/35.629 |
| 2007/0125170 | A1 | * | 6/2007 | Tenney | 73/290 R |

* cited by examiner

*Primary Examiner* — Henry Liu
(74) *Attorney, Agent, or Firm* — Patterson Thuente Pedersen, P.A.

(57) ABSTRACT

A bearing-protection device for protecting and lubricating bearings. The bearing-protection device provides positive indication of lubrication levels provided to the bearings and includes a protector housing defining a lubrication chamber with an outer wall, a proximal end and a distal end. The device also includes a piston assembly movable within the lubrication chamber, the piston assembly biased in a direction generally toward the proximal end of the bearing protector housing, and a viewing window defined in the outer wall of the bearing protector housing. Indicia associated with the piston is viewable through the viewing window to indicate a level of lubricant within the chamber.

18 Claims, 4 Drawing Sheets

BEARING PROTECTION WITH POSITIVE LUBRICANT-LEVEL INDICATION

The present invention is generally directed to bearing protection. More specifically, the present invention is directed to methods, systems, and devices for wheel-bearing protection that include positive confirmation of lubricant levels.

BACKGROUND OF THE INVENTION

To avoid failure of wheel bearings in towed vehicles, lubrication of the wheel bearings must be maintained. For a typical wheel bearing used in a trailer, for example, grease is packed into the hub space surrounding the wheel bearing and weight-bearing axle. A cap is placed over the open-ended hub to keep the region free from dust and debris, and to keep the grease from migrating away from the bearing. Over time, the grease deteriorates and requires replacement or replenishment. The cap, wheel, bearing and so on may be removed periodically to allow repacking of the wheel-bearing grease so as to maintain proper operation. If such maintenance is not carried out, the loss of adequate lubrication may result in damage to, or seizing of, the wheel bearing.

To prevent such situations, a number of devices intended to keep wheel bearings lubricated have been developed, and are available in the marketplace. Some such devices seal the area around the wheel bearing and the hub to keep not only dust and debris away from the bearing, but also water and moisture. Other more advanced devices not only protect and shield the wheel bearing, but also provide enhanced lubrication. One such device is the bearing protector device disclosed in U.S. Pat. No. 6,199,662 to Felk. The device disclosed by Felk attaches to a wheel bearing housing and includes a spring-loaded piston. The device not only stops dirt and water from entering the hub, but also by means of a piston forces a reservoir of grease through a housing toward the wheel bearing. Although such known devices provide a degree of protection and lubrication, a user of such a device still may not easily determine whether additional lubrication need be added to the system.

However, several methods and devices are available to alert a user of a low-lubrication level. Some advanced vehicle bearing systems may employ sophisticated alarm systems to indicate low-lubrication levels. Other, less advanced systems, such as those used on lighter-load trailers, may rely on indirect, mechanical methods to alert a user to low-lubrication levels. One such device is a bearing-lubrication device as described in U.S. Pat. No. 4,941,550, and RE 34,391, both issued to Blake. The bearing lubricating devices of Blake attach to a wheel bearing housing and include a spring-loaded piston that forces grease through a housing of the device toward the wheel bearing, as is known in the art. The bearing lubricating device also includes an external mechanical indicator attached to the piston that indicates the piston position. Under ideal conditions, the position of the piston corresponds to an amount of lubrication in the device, such that a user may obtain an indirect indication of lubrication levels in the device.

Despite the availability of bearing lubrication and protection devices as described above, none provide direct, positive confirmation of actual lubrication levels within the device.

SUMMARY OF THE INVENTION

The present invention is directed to a bearing-protection device for protecting and lubricating wheel bearings installed in hubs of towable vehicles. The bearing-protection device provides positive indication of lubrication levels provided to the wheel bearings and includes a generally cylindrical bearing protector housing defining a lubrication chamber with an outer wall, a proximal end and a distal end. This embodiment also includes a piston assembly movable within the lubrication chamber, the piston assembly biased in a direction generally toward the proximal end of the bearing protector housing. The bearing-protection device also includes a viewing window defined in the outer wall of the bearing protector housing, wherein the piston assembly, or indicia associated with the piston assembly is viewable through the viewing window to indicate a level of lubricant within the lubrication chamber.

The bearing-protection device may also include lubricant-level indicia on the outer wall of the bearing protector housing. In an embodiment, lubricant-level indicia comprise first and second adjacent indicator bands. The first indicator band may be positioned on the outer wall at a first location such that when the piston assembly or indicia associated with the piston assembly is at least partially registered with the first indicator band, a lubrication level is indicated as low. The second indicator band is positioned on the outer wall at a second location such that when the piston assembly or indicia associated with the piston assembly is at least partially aligned with the second indicator band, a lubrication level is indicated as adequate.

The present invention also includes methods of monitoring a lubricant level in the vicinity of a wheel bearing of a towable vehicle that has a hub rotatable about an axle. In an embodiment, the method includes coupling a bearing-protection device that includes a viewing window and defines a lubrication chamber to the hub of the towable vehicle, adding a lubricant to the lubrication chamber in the vicinity of the wheel bearing, rotating the wheel bearing, hub, and bearing-protection device about the axle of the towable vehicle, and aligning a piston assembly of the bearing-protection device, or indicia associated with the piston assembly, with the viewing window such that the piston assembly or indicia is visible through the viewing window to indicate the lubricant level.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

The invention can be understood in consideration of the following detailed description of various embodiments of the invention in connection with the accompanying drawings, in which.

Figure 1:
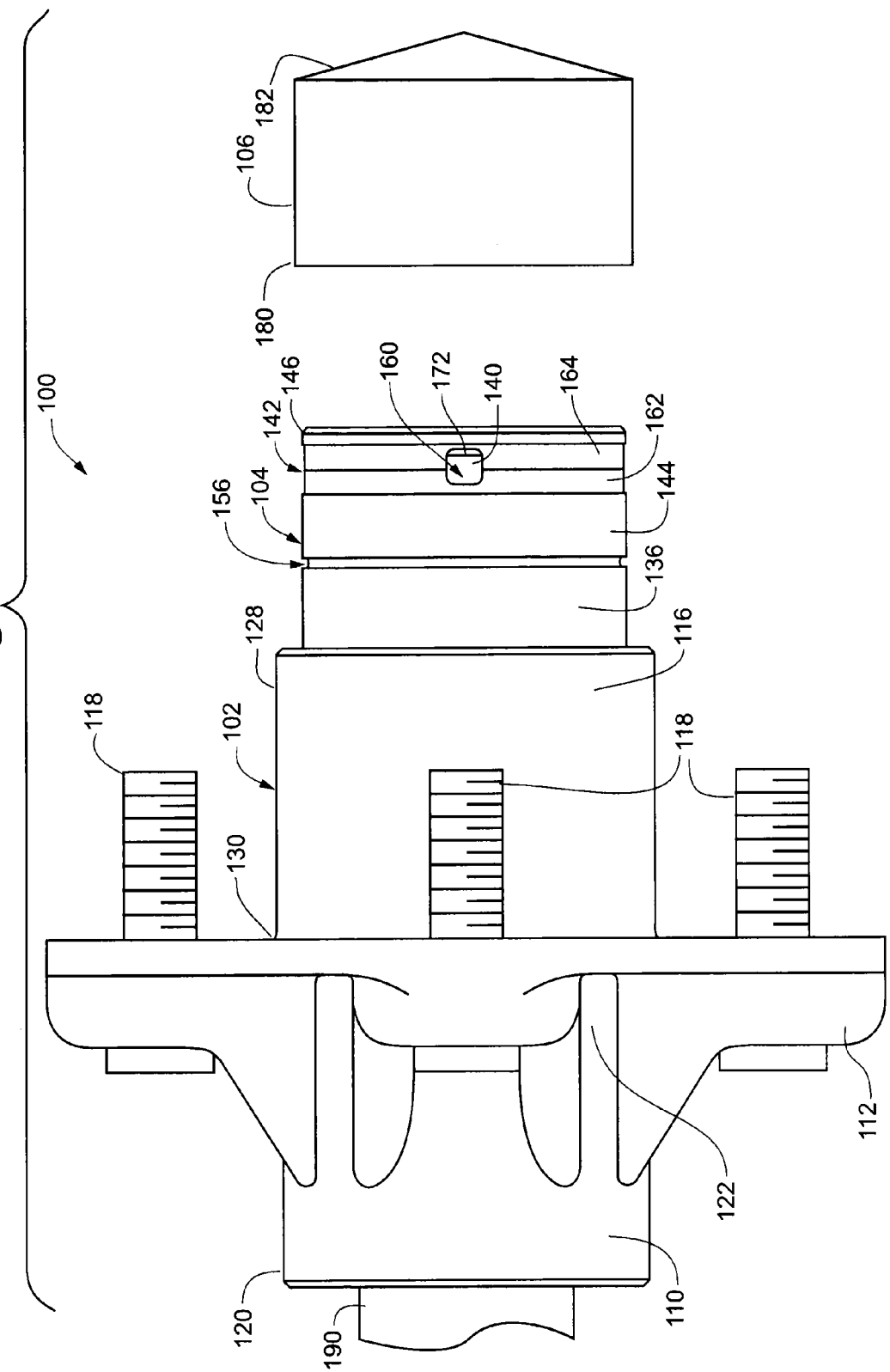
FIG. 1 is a front view of a bearing protection system, according to an embodiment of the present invention, the system indicating an adequate level of lubrication.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE FIGURES

Figure 2:
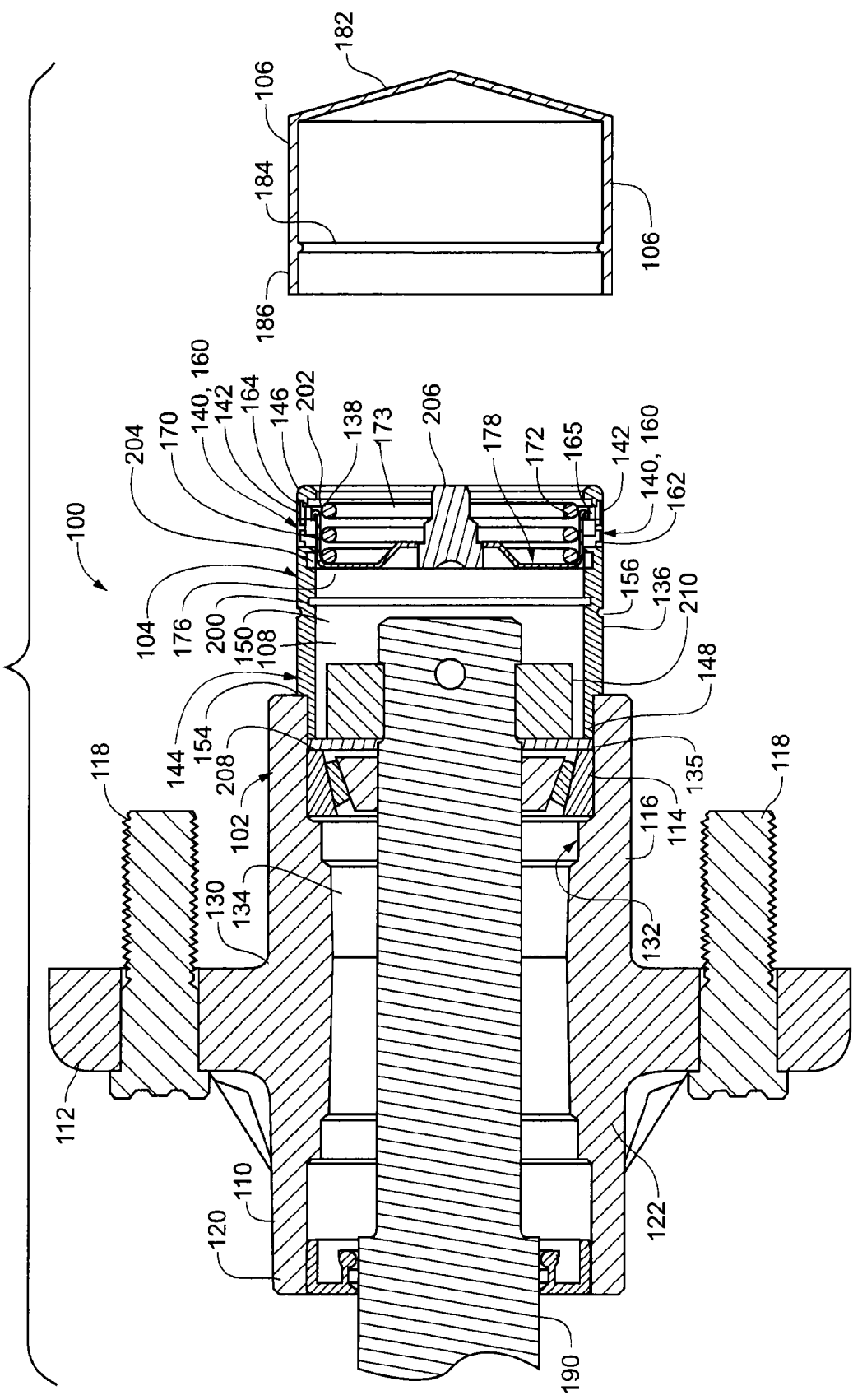
FIG. 2 is a cross-section of a bearing, bearing-protection device and cap of the system of FIG. 1, the bearing-protection device indicating an adequate level of lubrication.

Referring to FIGS. 1 and 2, an embodiment of bearing protection system 100 is depicted. As depicted, system 100 includes hub assembly 102, bearing-protection device 104, cap 106 and lubricant 108.

Hub assembly 102, in an embodiment, includes inside housing portion 110, flange portion 112, outside bearing 114, and outside housing portion 116. Hub assembly 102 may also include multiple fasteners 118 for fastening a wheel (not depicted) to flange portion 112. As will be understood by those skilled in the art, hub assembly 102 may be made of many of known materials, including cast iron, steel, and other such metals.

Inside housing 110 includes distal end 120 at a point furthest from flange 112, and proximal end 122 at a point near flange 112. Outside housing 116 includes distal end 128 at a point furthest from flange 112, proximal end 130 at a point proximate flange 112, and inside surface 132. Inside housing 110 and outside housing 116 define housing cavity 134, and recess 135. In an embodiment, recess 135 is formed at distal end 128 of outside housing 116 such that a diameter of housing cavity 134 at distal end 128 may be larger than a diameter of housing cavity 134 at proximal end 130. Housing cavity 134 generally extends from distal end 120 of inside housing 110 to distal end 128 of outside housing 116.

Bearing-protection device 104 comprises bearing protector housing 136, piston assembly 138, viewing windows 140, and lubricant-level indicia 142.

In an embodiment, housing 136 is generally cylindrical and includes outer wall 144, distal end 146, proximal end 148, and defines lubrication chamber 150. An outside diameter of housing 136 at proximal end 148 may be slightly smaller than an inside diameter of distal end 128 of outside housing 116 of hub assembly 102, such that proximal end 148 may be inserted into, and frictionally retained, in recess 135 of hub assembly 102. In an embodiment, both distal end 146 and proximal end 148 of housing 136 are open.

In an embodiment, bearing protector housing 136 may also define channel 156. Channel 156 may be circumscribed about an outside surface of bearing protector housing 136, and sized to receive a complementary ridge or projection of cap 106, as described further below.

Bearing protector housing 136 as depicted also defines viewing orifice 160. Viewing orifice 160 comprises an orifice or hole through outer wall 144. Viewing orifice 160 in an embodiment may generally define an oval shape as depicted, but in other embodiments may define other shapes, including circular, rectangular and so on. Further, the size of viewing orifice 160 may vary also vary, with larger or smaller orifice sizes being used to create larger or smaller areas for viewing.

As depicted, viewing orifice 160 may be positioned substantially at distal end 146 of housing 136. In other embodiments, viewing orifice 160 may be positioned elsewhere on housing 136. As discussed further below, the position of viewing orifice 160 is generally dependent upon the location of piston assembly 138 within housing 136 such that a relative position of piston assembly 138 may be seen through viewing orifice 160.

In embodiments of the invention, viewing orifice 160 of bearing-protection device 104 may be left open. In other embodiments, viewing orifice 160 may be filed with a generally transparent or translucent material. Such transparent or translucent material may include any of known polymers, plastics, glass, or other such materials that would allow passage of some light such that a user may view through viewing window 140.

Lubricant-level indicia 142 of bearing-protection device 104 in the embodiment depicted comprise a pair of adjacent indicator bands, low-level indicator band 162 and adequate-level indicator band 164. As depicted, indicator bands 162 and 164 comprise adjacent bands of colored material on outer wall 144 of bearing protector housing 136. As discussed further below, indicator bands 162 and 164 in conjunction with piston assembly 138 indicate a lubricant level in chamber 150 to a user. Indicator bands 162 and 164 may comprise bands of elastomeric material received in an inset 165 in outer wall 144, or may otherwise include painted bands, stickers, or other markers adhered to, or affixed to, outer wall 144. In an embodiment, low-level indicator band 162 may be a red color to indicate that lubricant levels are low, while adequate-level indicator band 164 may be green to indicate that lubricant levels are adequate.

A transition line defined by a junction of right-side edge of low-level indicator band 162 with a left-side edge of adequate-level indicator band 164 defines a transition between low-levels of lubricant and adequate levels of lubricant. As depicted, bands 162 and 164 are positioned on outer wall 144 such that the transition line may be generally registered at a left-to-right midway point of viewing window 140 for optimal viewing. However, in other embodiments, bands 162 and 164 may be joined at a point other than the midway point.

In other embodiments, lubricant level indicia 142 may include a single, relatively narrow line or band, rather than a pair of colored bands. In such an embodiment, lubricant levels may be checked relative to such a single-line indicator.

Piston assembly 138 in an embodiment includes piston 170 defining piston front edge 172, and biasing spring 173. Piston 170 comprises proximal surface 176 and distal surface 178, and forms a cup having an outside diameter equal to, or slightly less than an inside diameter of chamber 150 such that piston 170 may be inserted into chamber 150 of housing 136. Grease fitting 206, which may be a common "zerk" fitting, extends through piston 170 to enable lubricant 108 to be injected into lubrication chamber 150. Piston 170 is disposed between inner stop ring 200 and outer stop ring 202, which may be common c-rings, received in an accommodating recess in housing 136.

Biasing spring 173 bears against outer stop ring 202 and distal surface 178 of piston 170 and biases piston 170 toward inner stop 200. Bearing-protection device 104 may also include one or more seals 204 to keep lubricant 108 within chamber 150. Such seals may include o-rings, such as depicted, made of rubber, polymers, and so on. In some cases, additional seals may be positioned near proximal end 148 of bearing-protection device 104.

Cap 106 as depicted comprises a generally hollow, cylindrical shape open at proximal end 180 and closed at distal end 182. Proximal end 180 defines a circular opening, and is sized to fit over distal end 146 of bearing housing 136. Distal end

182 may define a conical shape as depicted, or in other embodiments, not depicted, may define other shapes, such as a circular plane.

Referring specifically to FIG. 2, cap 106 may also include circumferential projection 184. Projection 184 extends outwardly away from an inside surface of cap 106, and extends circumferentially about the inside surface of cap 106, thus forming a contiguous ring-like structure. The size and shape of projection 184 is complementary to channel 156 of bearing-protection device 104 such that projection 184 will substantially fit into channel 156. When cap 106 is properly placed onto bearing-protection device 104, projection 184 fits into channel 156, thereby locking cap 106 onto bearing-protection device 104. In alternate embodiments, projection 184 may not be contiguous, and rather, may comprise separate projections that fit into channel 156, which may be contiguous, or may be discontinuous, and complementary to projection 184.

Referring to FIGS. 1 and 2, when bearing protection system 100 is assembled, one or more bearings 114 are placed over a spindle 190 of a trailer, vehicle, or other such wheeled device, and are retained on spindle 190 with washer 208 and nut 210. Hub assembly 102 receives a portion of spindle 190, such that an end of the axle 190 extends into chamber 150 of hub 102. A wheel may be fastened to hub assembly 102 using fasteners 118, and hub assembly 102 with the attached wheel rotate about spindle 190.

Bearing-protection device 104 is inserted into distal end 128 of outside housing 116, such that proximal end 148 of bearing protector housing 136 extends into cavity 134 of hub 102. In the depicted embodiment, bearing-protection device 104 is secured to hub 102 by means of a friction fit. When bearing protector housing 136 is fully engaged with outside housing 116 of hub 102, outside shoulders 154 are generally adjacent housing 116.

Referring specifically to FIG. 2, bearing protection system 100 is depicted as filled with an adequate level of lubricant 108. In operation, a user fills chamber 150 of bearing-protection device 104 with a lubricant 108, such as bearing grease. As discussed above, lubricant 108 may be pumped into, or otherwise added to, chamber 150 via grease fitting. In an embodiment, such a lubricant fitting may be part of piston assembly 138. Adding lubricant 108 into chamber 150 pressurizes chamber 150 and causes a force to be applied to proximal surface 176 of piston 170. The force applied to piston 170 is generally counter to the bias of biasing spring 173 discussed above. When this counter force becomes larger than the biasing spring force, piston 170, moves in a direction generally away from hub 102, and toward distal end 146 of bearing protector housing 136.

Thus, when chamber 150 is full, or has a sufficient level of lubricant 108, lubricant 108 penetrates the vicinity surrounding an end of axle 190, bearing 114, and hub 102, providing lubrication to the rotating parts.

Referring to both FIGS. 1 and 2, viewing window 140 enables viewing piston 170 and particularly front edge 172 when cap 106 is removed. As depicted, front edge 172 may be seen through window 140. When lubricant 108 levels are high or adequate within chamber 150, the counter-force applied to piston 170 causes front edge 172 to be positioned near distal end 146 of housing 136. In such a position, front edge 172 appears within viewing window 140, and appears generally toward a distal, or right, side of viewing window 140.

In such a position indicating adequate levels of lubricant 108, the front edge 172 also generally registers with adequate lubricant-level indicator band 164, when viewed by a user. In this manner, a user may positively confirm that there are adequate levels of lubricant 108 at bearing 114 such that the wheel and hub 102 may be expected to rotate freely with sufficient lubrication.

Figure 3:
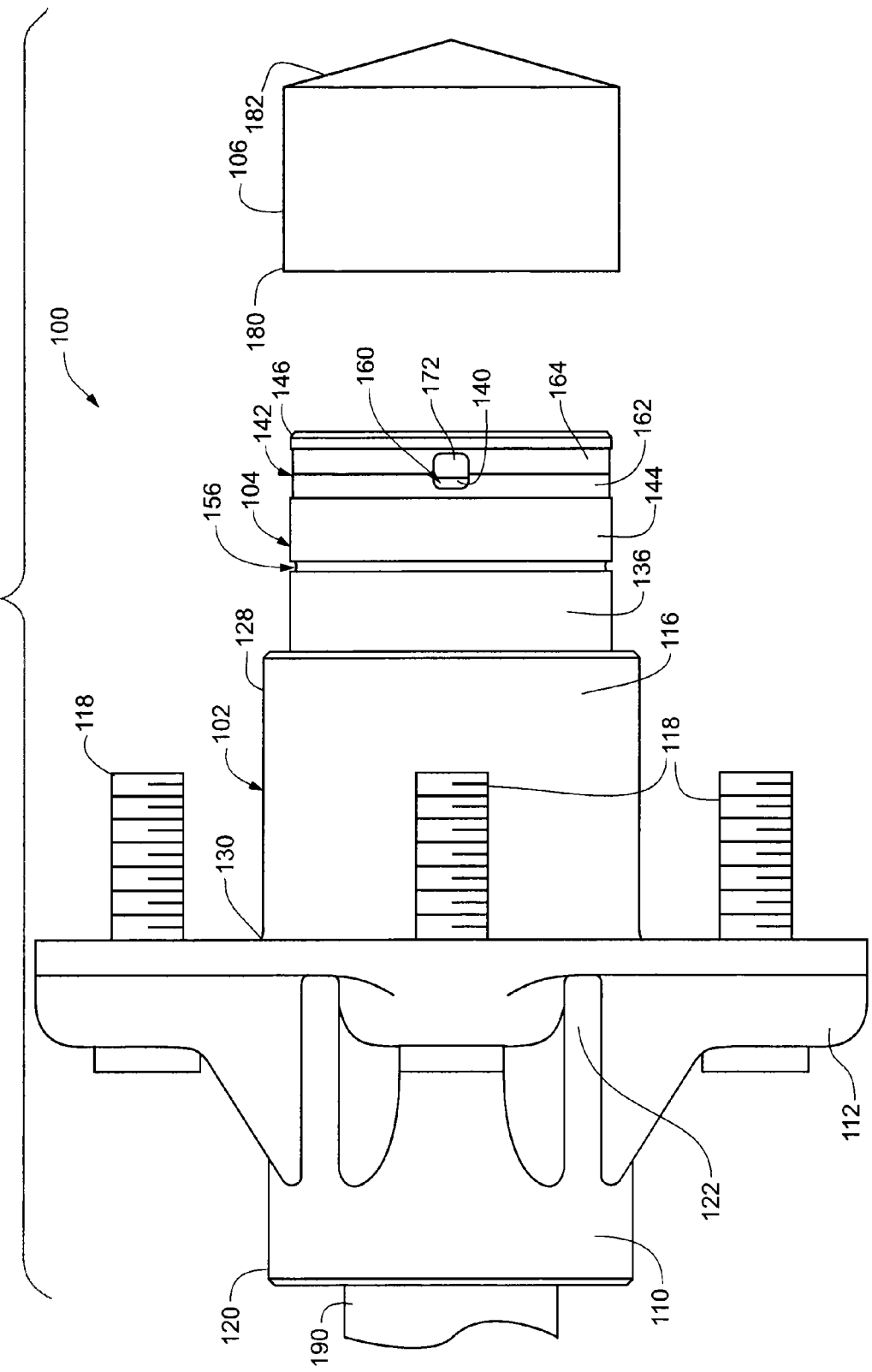
FIG. 3 is a front view of the bearing protection system of FIG. 1, the system indicating an inadequate level of lubrication.
Figure 4:
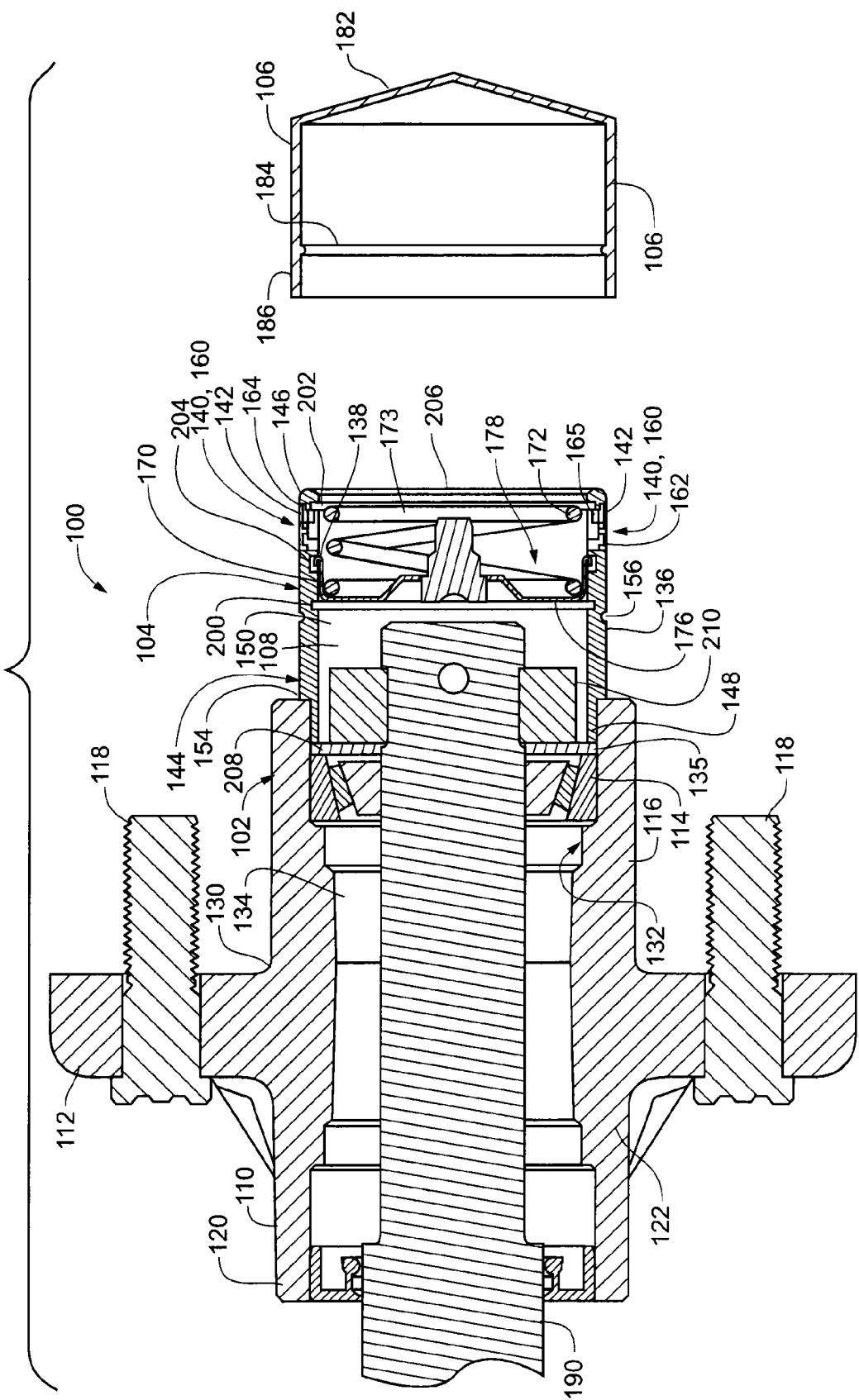
FIG. 4 is a cross-section of the bearing, bearing protector and cap of FIG. 2, the bearing-protection device indicating an inadequate level of lubrication.

Referring to FIGS. 3 and 4, over time, and with use, lubricant 108 may begin to migrate out of chamber 150 such that the amount of lubricant 108 within bearing-protection device 104 and chamber 150 decreases. As the amount of lubricant 108 decreases, the counter force on piston assembly 138 caused by lubricant 108 at proximal surface 176 decreases, and the bias of biasing spring 173 causes piston assembly 138 to advance toward proximal end 148 of housing 136 and hub 102.

As piston assembly 138 advances toward hub 102, front edge 172 also advances toward hub 102. As more and more lubricant 108 exits chamber 150 front edge 172 can be viewed through viewing window 140 as it advances toward hub 102. As depicted in FIGS. 3 and 4, piston assembly 138 has advanced toward hub 102, and front edge 172 has moved to a proximal side of window 140.

In the depicted position, generally to the left of center, or on the proximal side, of window 140 front edge 172 generally registers with low-level indicator band 162. Such a position indicates to a user that lubricant 108 is reaching a low level, and should be replenished to ensure adequate, ongoing lubrication of bearing 114.

In alternate embodiments, indicator bands 162 and 164 may be replaced by other measurement indicia, such as numbers, words, or more than two colored indicators, to confirm lubrication levels within bearing-protection device 104. In other embodiments, instead of front edge 172 being visible through viewing window 140, other indicia associated with piston 170 may be viewable through viewing window 140. For example, a separate component coupled with piston 170 may be viewable through viewing window 140 to indicate the position of piston 170.

Although some known bearing-lubrication systems and protection devices provide an indirect indication of lubrication levels, the present invention provides direct, positive indication of lubrication levels via viewing window 140. Viewing window 140 enables a user to see the actual position of piston assembly 138 and front edge 172 within chamber 150. Should the movement of piston assembly 138 be obstructed due to debris, mechanical malfunction, and so on, such a situation would be apparent to a user viewing through viewing window 140.

Consequently, the present invention also includes methods of monitoring, or viewing and maintaining a lubricant level of wheel bearings of towable vehicle as described above. Such methods include coupling the bearing-protection device to the towable vehicle, adding a lubricant, such as grease, to the lubrication chamber in the vicinity of the wheel bearing, and rotating the wheel bearing, hub, and bearing-protection device about the axle of the towable vehicle. As lubricant gradually exits the vicinity of the hub and wheel bearing, lubricant levels decrease, such that the lubricant-level indicator aligns with the viewing window and is visible through the viewing window.

In some embodiments, such methods also include viewing the piston within the lubrication chamber, aligning the piston with lubricant-level indicia on an outside surface of the bearing-protection device, causing the piston to move from a distal side of the window to a proximal side of the window, thereby indicating a low-level of lubricant, and adding a lubricant into the lubrication chamber through a lubrication channel of the bearing-protection device.

The embodiments above are intended to be illustrative and not limiting. Additional embodiments are within the claims.

In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed:

1. A bearing-protection device for protecting and lubricating wheel bearings installed in hubs of towable vehicles while positively indicating lubrication levels provided to the wheel bearings, the bearing-protection device comprising:
    a bearing protector housing defining a lubrication chamber and including an outer wall, a proximal end and a distal end, a viewing window defined in the outer wall of the bearing protector housing, the viewing window having a proximal side and a distal side;
    a lubricant-level indicia on the outer wall of the bearing protector housing intersecting the viewing window intermediate the proximal side and the distal side; and
    a piston assembly movable within the lubrication chamber, the piston assembly biased in a direction generally toward the proximal end of the bearing protector housing, wherein at least a portion of the piston assembly is viewable through the viewing window to determine the position of the piston assembly relative to the lubricant-level indicia, thereby providing an indication of a lubrication level in the lubrication chamber.

2. The bearing-protection device of claim 1, wherein the lubricant-level indicia comprises an intersection between first and second adjacent indicator bands.

3. The bearing-protection device of claim 2, wherein the first indicator band is positioned on the outer wall at a first location such that when the lubricant-level indicator is at least partially registered with the first indicator band, a lubrication level is low.

4. The bearing-protection device of claim 2, wherein the second indicator band is positioned on the outer wall at a second location such that when the lubricant-level indicator is at least partially registered with the second indicator band, a lubrication level is adequate.

5. The bearing-protection device of claim 2, wherein the first indicator band comprises a red band and the second indicator band comprises a green band.

6. The bearing-protection device of claim 1, wherein a solid transparent or translucent material is provided in the viewing window.

7. The bearing-protection device of claim 1, wherein the proximal end has an outside diameter slightly smaller than an inside diameter of an outside housing of a wheel hub such that the proximal end is adapted to be inserted into the outside housing of the wheel hub.

8. The bearing-protection device of claim 1, wherein the bearing protector housing has a generally cylindrical shape.

9. The bearing-protection device of claim 1, further comprising a cap adapted to fit over the distal end of the bearing protector housing.

10. The bearing-protection device of claim 9, wherein the bearing protector housing further comprises a circumferential channel, and the cap comprises a ridge complementary to the channel such that a portion of the ridge fits into the channel, thereby securing the cap to the bearing protector housing.

11. A bearing-protection device for protecting and lubricating wheel bearings installed in hubs of towable vehicles while positively indicating lubrication levels provided to the wheel bearings, the bearing-protection device comprising:
    a bearing protector housing defining a lubrication chamber and including an outer wall, a proximal end and a distal end, a viewing window defined in the outer wall of the bearing protector housing, the viewing window having a proximal side and a distal side;
    a lubricant-level indicia on the outer wall of the bearing protector housing intersecting the viewing window intermediate the proximal side and the distal side; and
    a piston assembly movable within the lubrication chamber, the piston assembly biased in a direction generally toward the proximal end of the bearing protector housing, the piston assembly including means viewable through the viewing window to determine the position of the piston assembly relative to the lubricant-level indicia for providing an indication of a lubrication level.

12. A bearing-protection device for protecting and lubricating wheel bearings installed in hubs of towable vehicles while positively indicating lubrication levels provided to the wheel bearings, the bearing-protection device comprising:
    a bearing protector housing defining a lubrication chamber and including an outer wall, a proximal end and a distal end, a viewing window defined in the outer wall of the bearing protector housing, the viewing window having a proximal side and a distal side;
    a lubricant-level indicia on the outer wall of the bearing protector housing intersecting the viewing window intermediate the proximal side and the distal side; and
    a piston movable within the lubrication chamber, the piston biased in a direction generally toward the proximal end of the bearing protector housing, wherein indicia associated with the piston is viewable through the viewing window to determine the position of the piston indicia relative to the lubricant-level indicia, thereby providing an indication of a lubrication level in the lubrication chamber.

13. The bearing-protection device of claim 12, wherein the indicia associated with the piston is a front edge of the piston.

14. The bearing-protection device of claim 12, wherein the lubricant-level indicia comprises an intersection between first and second adjacent indicator bands.

15. The bearing-protection device of claim 14, wherein the first indicator band is positioned on the outer wall at a first location such that when the lubricant-level indicator is at least partially registered with the first indicator band, a lubrication level is low.

16. The bearing-protection device of claim 14, wherein the second indicator band is positioned on the outer wall at a second location such that when the lubricant-level indicator is at least partially registered with the second indicator band, a lubrication level is adequate.

17. The bearing-protection device of claim 12, further comprising a cap adapted to fit over the distal end of the bearing protector housing.

18. The bearing-protection device of claim 17, wherein the bearing protector housing further comprises a circumferential channel, and the cap comprises a ridge complementary to the channel such that a portion of the ridge fits into the channel, thereby securing the cap to the bearing protector housing.

* * * * *